(12) United States Patent
Daalmans et al.

(10) Patent No.: US 6,851,318 B2
(45) Date of Patent: Feb. 8, 2005

(54) MOTION DETECTOR ACCORDING TO THE FERRARIS PRINCIPLE

(75) Inventors: Gabriel Daalmans, Hoechstadt (DE); Roland Finkler, Erlangen (DE); Viktor Wesselak, Spardorf (DE)

(73) Assignee: Siemens Aktiengesellschaft, München (DE)

( * ) Notice: Subject to any disclaimer, the term of this patent is extended or adjusted under 35 U.S.C. 154(b) by 12 days.

(21) Appl. No.: 10/395,308

(22) Filed: Mar. 24, 2003

(65) Prior Publication Data

US 2003/0193396 A1 Oct. 16, 2003

(30) Foreign Application Priority Data

Apr. 15, 2002 (DE) ......................... 102 16 635

(51) Int. Cl.[7] .............................. G01P 15/08; G01P 3/49
(52) U.S. Cl. ............................... 73/514.31; 73/514.16; 324/164
(58) Field of Search .................. 73/514.16, 514.31, 73/514.39, 514.14; 324/160, 162–164, 165, 173, 174, 207.22, 207.25, 207.16, 207.17

(56) References Cited

U.S. PATENT DOCUMENTS

| | | | | |
|---|---|---|---|---|
| 3,848,157 A | * | 11/1974 | Kripl | ..................... 361/239 |
| 6,462,535 B1 | * | 10/2002 | Schwabe | ................... 324/164 |
| 6,636,032 B2 | * | 10/2003 | Schwabe | ................... 324/164 |

FOREIGN PATENT DOCUMENTS

| | | |
|---|---|---|
| DE | 1 201 587 PS | 4/1966 |
| DE | 37 30 841 A1 | 3/1988 |
| DE | 41 05 642 A1 | 9/1992 |
| DE | 38 80 268 T2 | 10/1993 |
| DE | 298 13 276 U1 | 11/1999 |
| WO | WO 01/023897 | * 4/2001 |
| WO | WO 02/093179 | * 11/2002 |

OTHER PUBLICATIONS

G. Behr: "Alternating current tachometer machines operating according to the Ferraris principle"[Wechselstrom–Tachometermaschinen nach dem Ferrarisprinzip], ZMSR, vol. 8, 1959, pp. 355 to 360.

E. Habiger: "Foundation for dimensioning the Ferraris machines as a control element" [Grundlagen für die Bemessung der Ferrarismaschine als regelungstechnisches Bauelement], Elektrie, vol. 6 (1964), pp. 170 to 178.

IBM Technical Disclosure Bulletin, J.F. Kripl: Brushless Tachometer System, vol. 16, No. 1 Jun. 1973, pp. 237, 238.

* cited by examiner

*Primary Examiner*—Helen Kwok
(74) *Attorney, Agent, or Firm*—Henry M. Feiereisen

(57) ABSTRACT

In a motion detector according to the Ferraris principle, an excitation element applies an inhomogeneous time-dependent alternating magnetic field to an induction element. A motion of the induction element induces in the induction element an eddy current with a temporal characteristic that depends both on the velocity and the acceleration. A sensor element measures the temporal characteristic of the eddy current and supplies the temporal characteristic to a signal processing circuit which determines at least one useful signal that is proportional to the velocity and acceleration, respectively.

25 Claims, 5 Drawing Sheets

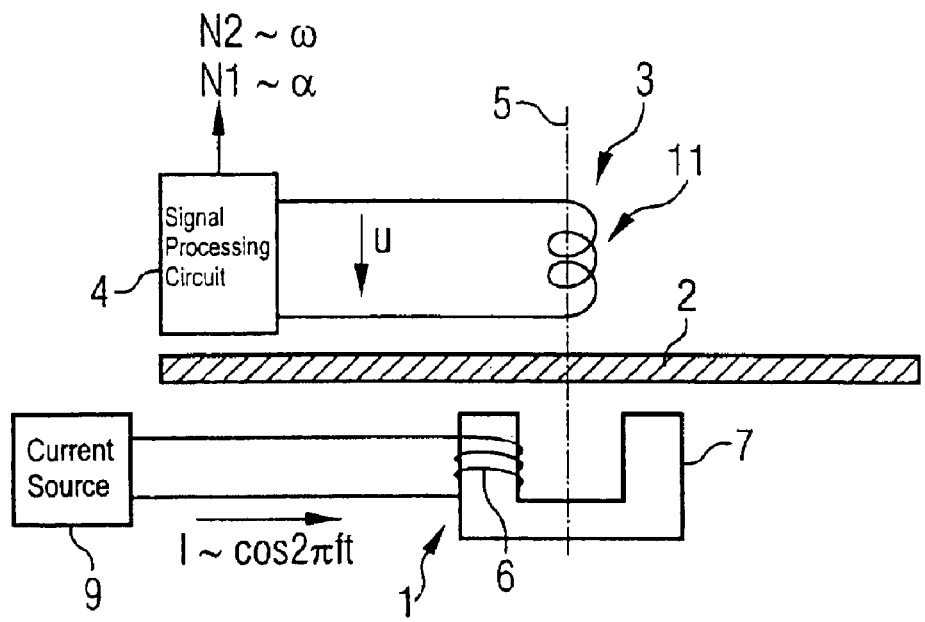
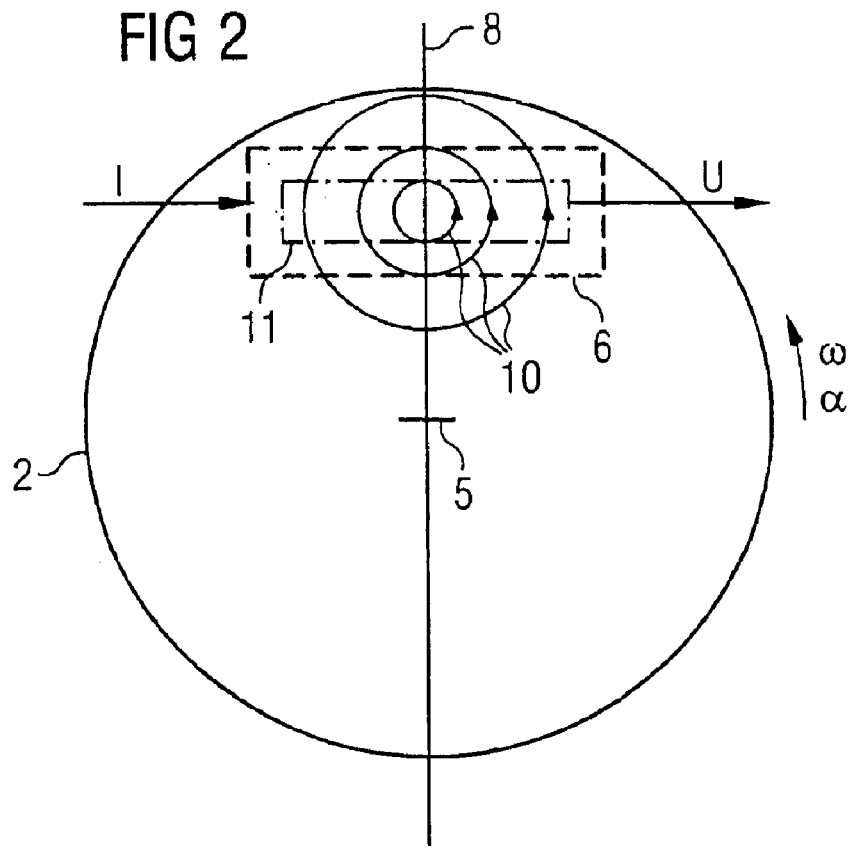

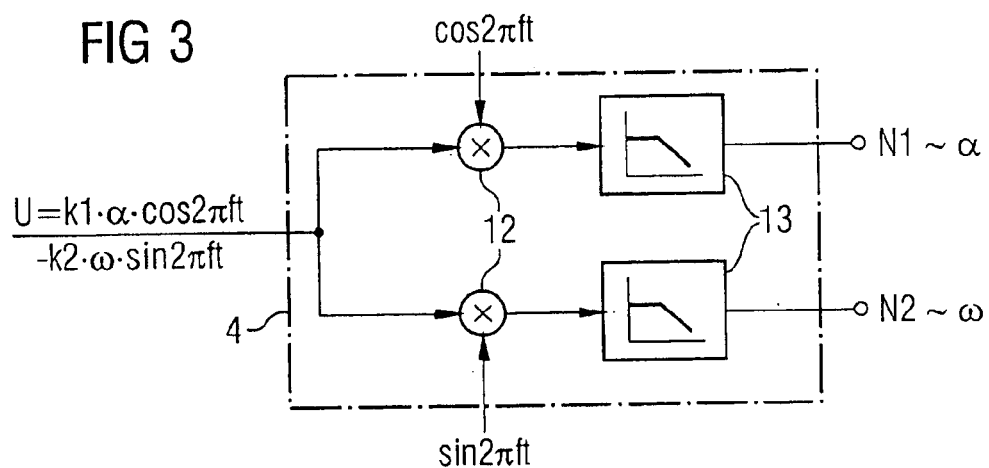
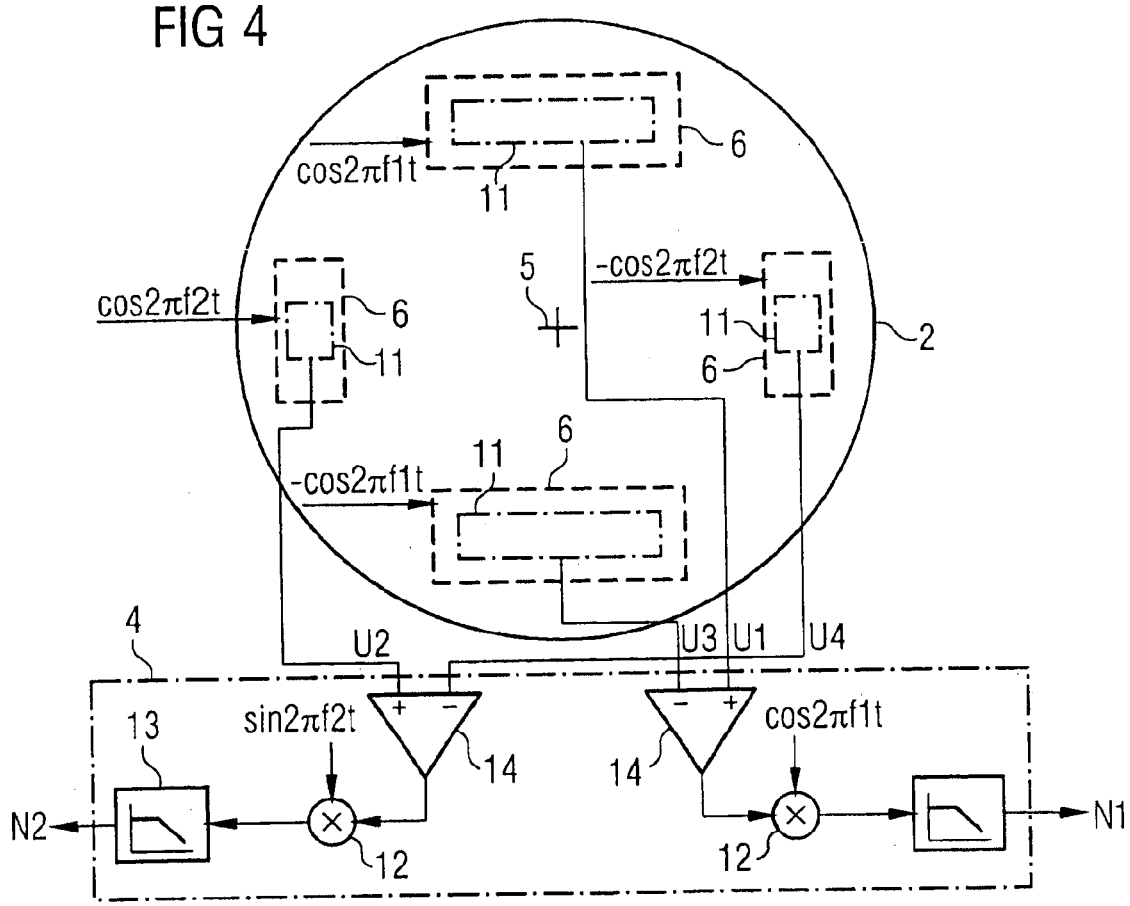

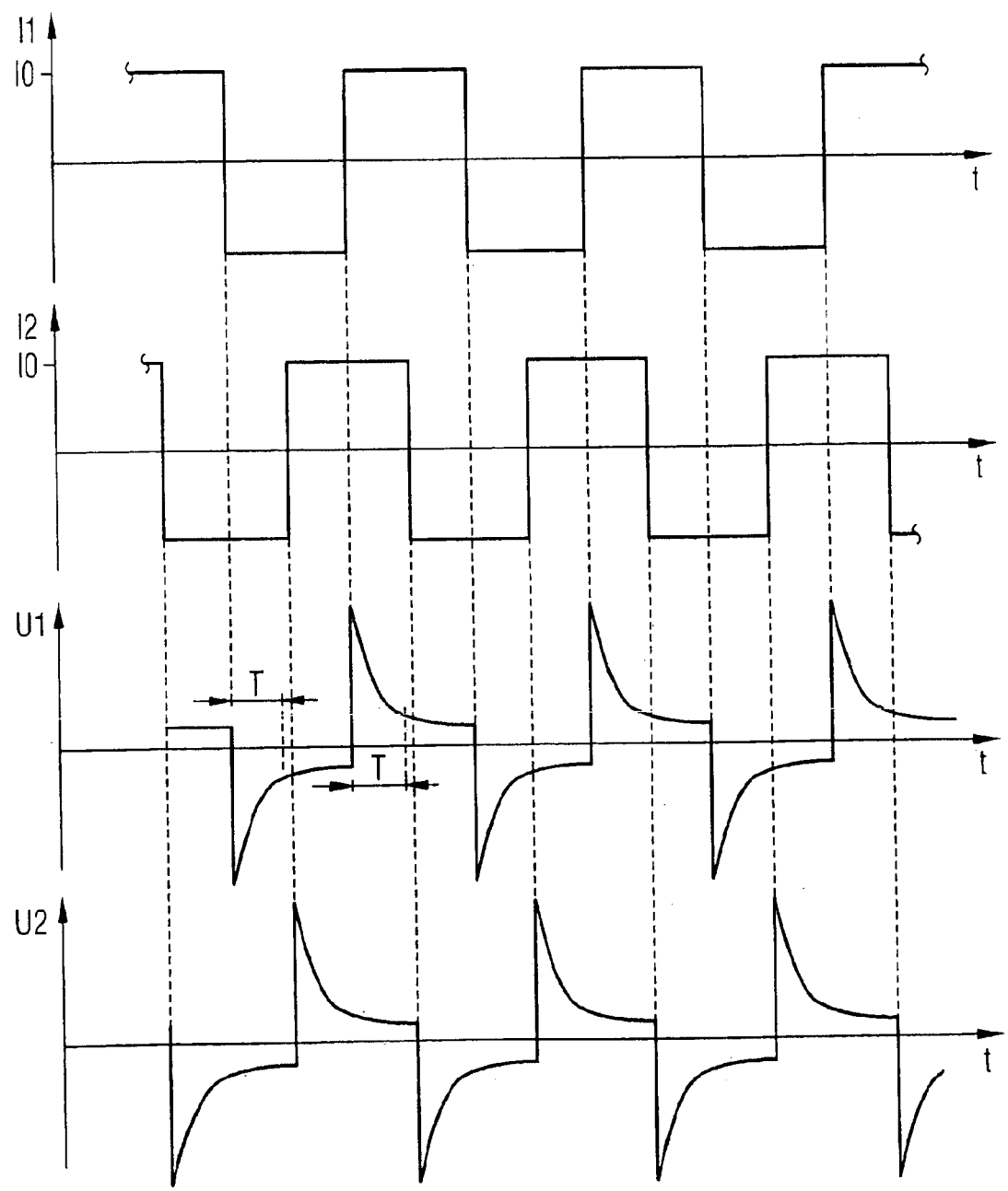

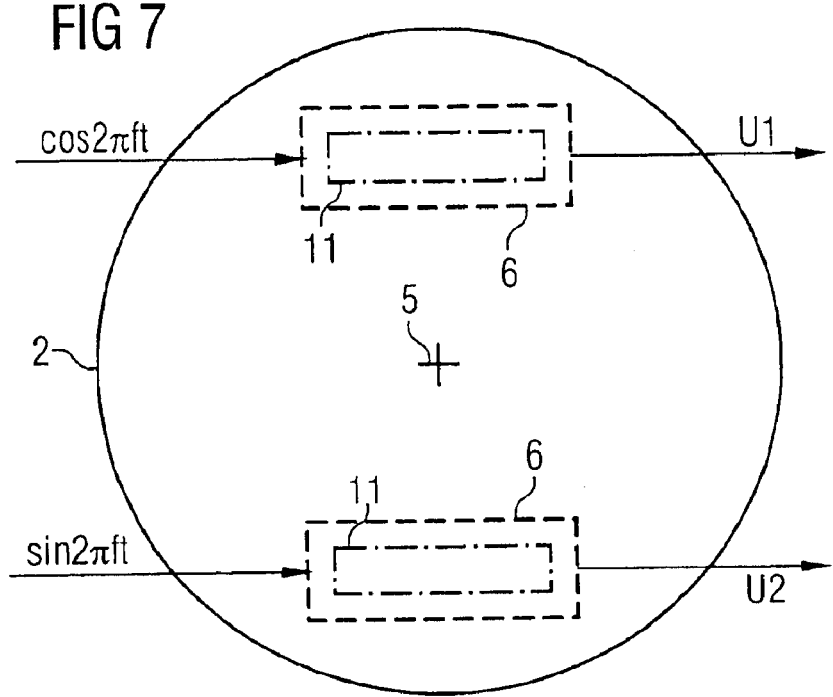
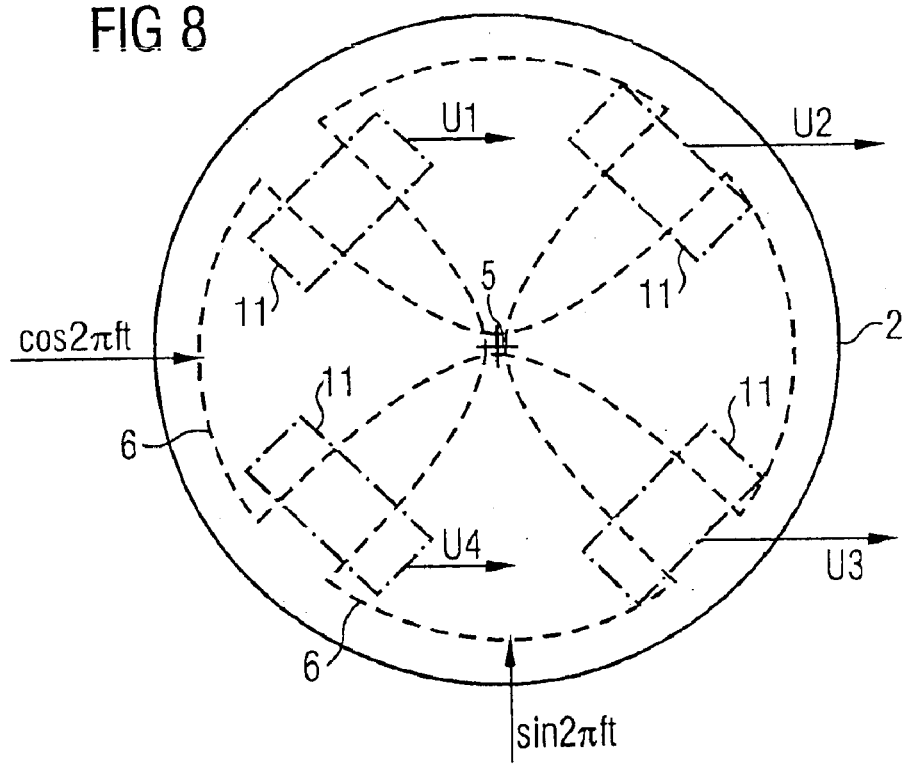

MOTION DETECTOR ACCORDING TO THE FERRARIS PRINCIPLE

CROSS-REFERENCES TO RELATED APPLICATIONS

This application claims the priority of German Patent Application, Serial No. 102 16 635.8, filed Apr. 15, 2002, pursuant to 35 U.S.C. 119(a)–(d), the disclosure of which is incorporated herein by reference.

BACKGROUND OF THE INVENTION

The present invention relates to a motion detector according to the Ferraris principle with an excitation assembly, an electrically conductive induction element and a sensor assembly.

Motion detectors of this type are known in the art. The excitation assembly of these motion detectors has at least one excitation element capable of applying an inhomogeneous magnetic field to the induction element. When the induction element moves, an eddy current is induced in the induction element due to the motion and the magnetic field. The sensor assembly has at least one sensor element for a measuring a measurement signal which is proportional to the changes in the eddy current induced in the induction element.

For example, DE 37 30 841 A1 or DE 298 13 276 U1 disclose that the excitation element can be excited by applying to the induction element an inhomogeneous time-independent magnetic field. In this case, the changes of the eddy current depend exclusively on the acceleration of the induction element. Accordingly, the measurement signal measured by the sensor element is also proportional to the acceleration of the induction element.

It is also known to apply with the excitation element an inhomogeneous, time-dependent alternating magnetic field to the induction element. Reference is made here to G. Behr: "Alternating current tachometer machines operating according to the Ferraris principle", ZMSR, Vol. 8, 1959, pp. 355 to 360, and E. Habiger: "Foundation for dimensioning the Ferraris machines as a control element", Elektrie, Vol. 6 (1964), pp. 170 to 178. The temporal changes of the eddy current are here dependent both on the velocity and on the acceleration of the induction element. With a suitable selection of the dimensions, in particular with a suitable choice of the excitation frequency, the measurement signal can be dominated by the velocity contribution. An acceleration component, however, is always present.

It would therefore be desirable and advantageous to provide a motion detector according to the Ferraris principle, which obviates prior art shortcomings and produces a useful signal which is truly proportional to either the velocity or to the acceleration of the induction element.

SUMMARY OF THE INVENTION

The invention relates to a motion detector according to the Ferraris principle excited by a time-dependent alternating magnetic field.

According to one aspect of the invention, a motion detector according to the Ferraris principle includes an excitation assembly with at least one primary excitation element for producing an inhomogeneous time-dependent alternating magnetic field; a movable electrically conducting induction element, wherein the inhomogeneous time-dependent alternating magnetic field is applied to the induction element; a sensor assembly with at least one primary sensor element adapted to measure at least one measurement signal; and a signal processing circuit. A motion of the movable induction element and the alternating magnetic field induces an eddy current in the induction element, wherein the temporal characteristic of the eddy current depends on the velocity and acceleration of the movable induction element. The measurement signal which is proportional to the temporal characteristic of the eddy current is supplied to the signal processing circuit. Based on the measurement signal, the signal processing circuit determines at least one useful signal, which is proportional to the velocity or the acceleration of the movable induction element. The velocity and the acceleration can correspond to a translation and/or a rotation.

The useful signal can be determined easily if the alternating magnetic field has a fundamental frequency, and in particular when the alternating magnetic field is sinusoidal or a square wave.

For a square wave, the computation can be simplified if during each period, the alternating magnetic field has for at least one time interval a constant nonzero value, and the time interval is greater than a rise or fall time of a change in the induced eddy current caused by a change of the alternating magnetic field. The measurement signal is then at least shortly before the end of the aforedescribed time interval directly proportional to the acceleration of the induction element.

The useful signal can have a particularly advantageous signal-to-noise ratio, if the signal processing circuit includes at least one demodulator which receives the measurement signal and a sinusoidal demodulation signal at the fundamental frequency and provides the useful signal as an output signal of the demodulator.

The signal quality can be further improved if the signal processing circuit includes a low pass filter connected after the demodulator and the useful signal corresponds to the low-pass-filtered output signal of the demodulator.

The acceleration or the velocity of the induction element can be alternatingly determined from the measurement signal—depending on the phase shift—if the demodulation signal is phase-shifted relative to the alternating magnetic field by an integer multiple of a quarter period.

Alternatively or in addition, the useful signal can be proportional to the acceleration of the induction element and an additional useful signal which is provided by the signal processing circuit can be correlated with the velocity of the induction element. This has the advantage that both the acceleration and the velocity are available for additional signal processing, in particular in control circuits.

The additional useful signal can be derived by the signal processing circuit from the measurement signal. When a square-wave-shaped alternating magnetic field is applied, a measurement signal proportional to the acceleration is obtained shortly before a level change, while a velocity component is mixed in at or shortly after the level change. In this situation, the additional useful signal is in fact correlated (only) with the velocity of the induction element. Alternatively, the measurement signal can be demodulated in two independent processing arms, once with a phase shift of zero and once with a phase shift of a quarter period. In this case, one of the two so determined useful signals is proportional to the velocity and the other useful signal is proportional to the acceleration of the induction element.

It is also feasible to derive the additional useful signal with the signal processing circuit from an additional measurement signal which can be measured by at least one additional sensor element of the sensor assembly.

The sensor elements can be optimized for the useful signal to be determined by configuring the primary sensor element different from the additional sensor element.

The eddy current induced in the induction element can be optimized for determining the useful signals, if the excitation assembly includes at least one additional excitation element capable of applying at least one additional inhomogeneous time-dependent alternating magnetic field to the induction element. This is true in particular if the additional and the primary excitation elements are constructed differently.

The useful signal can be further optimized, if the alternating magnetic field of the additional excitation element has a fundamental frequency that is a different from the fundamental frequency of the alternating magnetic field of the primary excitation element.

The alternating magnetic field of the primary excitation element can have the same fundamental frequency as the alternating magnetic field of the additional excitation element, and the phase of the alternating magnetic field of the primary excitation element can be shifted relative to a phase of the additional excitation element. At least one of the useful signals can then be determined from a linear combination of the measurement signals. This determination is particularly simple if the phase shift is an integer multiple of a quarter period of the fundamental frequency.

It is also possible to determine a useful signal which is proportional to the acceleration of the induction element, if a measurement signal is substantially proportional to the velocity of the movable induction element, the measurement signal is differentiated by the signal processing circuit, and the signal processing circuit limits the bandwidth of the differentiated measurement signal. The sensor assembly and/or the excitation assembly can be implemented as a coil assembly

BRIEF DESCRIPTION OF THE DRAWINGS

Other features and advantages of the present invention will be more readily apparent upon reading the following description of currently preferred exemplified embodiments of the invention with reference to the accompanying drawing, in which:

FIG. 1 shows a side view of one embodiment of a motion detector according to the Ferraris principle;

FIG. 2 shows a top view of the motion detector of FIG. 1;

FIG. 3 shows a signal processing circuit;

FIGS. 4, 5 show additional embodiments of motion detectors according to the Ferraris principle;

FIG. 6 shows a signal diagram;

FIGS. 7, 8 show additional embodiments of motion detectors according to the Ferraris principle.

DETAILED DESCRIPTION OF PREFERRED EMBODIMENTS

Figure 5:
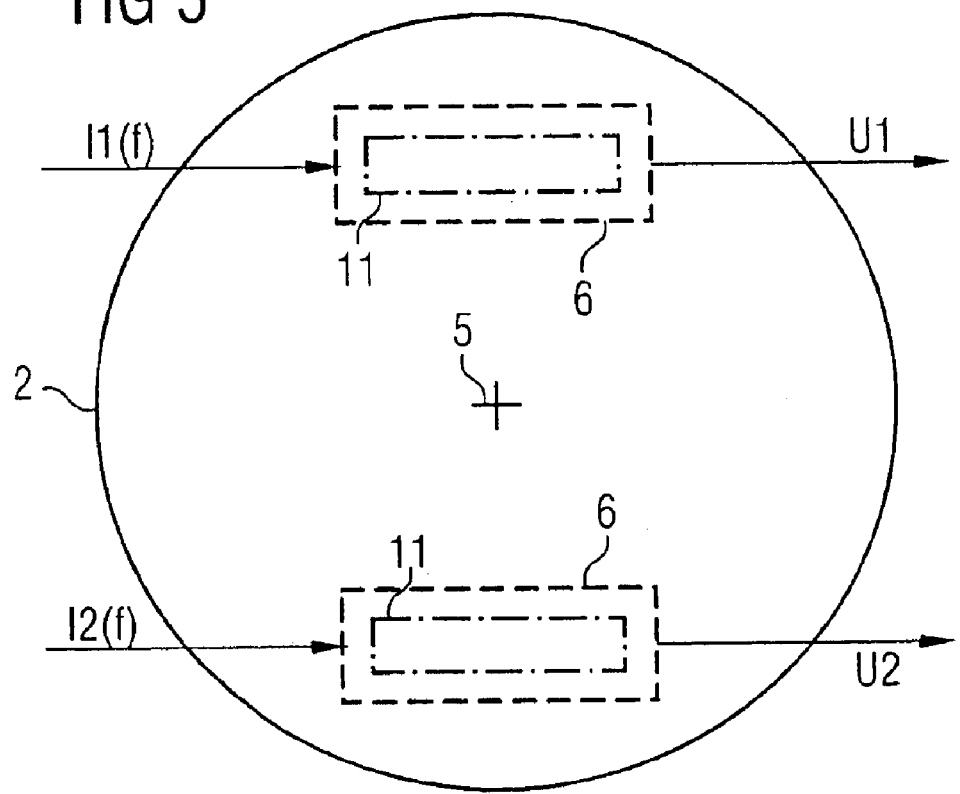

Throughout all the Figures, same or corresponding elements are generally indicated by same reference numerals. These depicted embodiments are to be understood as illustrative of the invention and not as limiting in any way.

Turning now to the drawing, and in particular to FIGS. 1 and 2, there is shown a motion detector according to the Ferraris principle which includes an excitation assembly 1, an induction element 2, a sensor assembly 3 and a signal processing circuit 4. The induction element 2 is made of a non-magnetic, electrically conductive material, e.g., copper. In the configuration of the motion detector depicted in FIGS. 1 and 2, the induction element 2 performs a rotary motion about a rotation axis 5. However, the induction element 2 can also perform a translatory motion.

As also seen in FIGS. 1 and 2, the excitation assembly 1 includes an excitation element 6. The excitation element 6 of FIG. 1 is implemented as a coil 6, with the magnetic field of the coil being amplified and directed by a U-shaped coil core 7. The arms of the coil core 7 shown in FIG. 2 are arranged to the left and to the right of the line 8. The excitation element 6 itself is indicated in FIG. 2 by a dashed line.

A current I is applied to the excitation element 6 by a current source 9, with a time-dependence proportional to $\cos(2\pi ft)$. f represents here the fundamental frequency of current I and t the time.

An inhomogeneous time-dependent alternating magnetic field is applied to the induction element 2 by the excitation element 6. The alternating magnetic field changes with the fundamental frequency f. The course of the magnetic field corresponds to a sine (or cosine) function without offset. When the induction element 2 moves with an angular velocity $\omega$, eddy currents 10 are induced in the induction element 2 due to the motion and the alternating magnetic field. The magnitude of the eddy currents 10 depends on the product of the magnetic field and the angular velocity $\omega$. Changes in the eddy currents 10 then depend of the angular velocity $\omega$ as well as on the angular acceleration $\alpha$ of the induction element 2.

The sensor assembly 3 includes a sensor element 11 for measuring a measurement signal U. As seen in FIG. 1, the sensor element 11 is formed as a coil 11. The measurement signal is proportional to the changes of the eddy currents 10 induced in the induction element 2. Addition of a coil core (not shown) enhances the sensitivity to changes in the eddy currents. The sensor element 11 is indicated in FIG. 2 by the dash-dotted line.

The signal U of the sensor element 11 has a functional dependence $$U = k1\,\alpha\cos - k2\,\omega\sin \qquad (1)$$

wherein k1 and k2 are proportionality constants. Also, the argument $2\pi ft$ has been omitted in eq. (1) for sake of clarity.

The measurement signal U (i.e., the voltage U induced in the sensor element 11) is supplied to the signal processing circuit 4. The signal processing circuit 4 derives from the measurement signal U useful signals N1, N2. The useful signal N1 is proportional to the angular acceleration $\alpha$, whereas the useful signal N2 is proportional to the angular velocity $\omega$ of the induction element 2. The determination of the useful signals N1, N2 will be described below with reference to FIG. 3.

As seen in FIG. 3, the signal processing circuit 4 includes two demodulators 12 and two low-pass filters 13. The low-pass filters 13 are connected after the demodulators 12. The measurement signal U is supplied to the demodulators 12, as seen in FIG. 3. Also supplied to the demodulators 12 are sinusoidal demodulation signals with a fundamental frequency f. The phase shift of the demodulation signals relative to the alternating magnetic field is zero in the upper demodulator 12 and a quarter period in the lower demodulator 12.

Accordingly, the signals at the outputs of the demodulators 12 include, on one hand, a low-frequency component which is proportional to the angular acceleration α and/or to the angular velocity ω, but also contain a high-frequency component. The high frequency components are filtered out by the low pass filters 13. The fundamental frequency of the low pass filters 13 is selected so that the output signals of the demodulators 12 are averaged by the low pass filters 13 over at least half a period of the fundamental frequency f. The useful signals N1, N2, which are proportional to the angular acceleration α and/or the angular velocity ω, are available directly at the outputs of the low pass filters 13.

If the demodulation signals supplied to the demodulators 12 are purely sinusoidal, then the exact time-dependence of the alternating magnetic field is no longer important, because the fundamental frequency f at the phase position sine and cosine, respectively, is filtered out by the demodulators 12 independent of the exact form of the alternating magnetic field. The embodiment according to FIGS. 1 to 3 can hence operate with other temporal characteristics of the alternating magnetic field, for example a saw-tooth or square-wave form.

The basic embodiment of the present invention described above with reference to FIGS. 1 to 3 operates quite well. However, certain improvements will now be described with reference to additional embodiments of the present invention.

For example, the sensor assembly 3 according to FIG. 4 includes four sensor elements 11 which are mutually offset by 90° relative to the rotation axis 5. A separate excitation element 6 is associated with each sensor element 11. The sensor elements are indicated in FIG. 4 by dash-dotted lines, whereas the excitation elements 6 are indicated by dashed lines.

The alternating magnetic fields of opposing excitation elements have the same fundamental frequency f1, but are phase-shifted relative to each other by half a period. The measurement signals U1, U3 of a corresponding sensor elements 11 are therefore supplied to a difference amplifier 14. Forming the difference eliminates symmetric errors which are caused, for example, by a homogeneous penetration of the sensor elements 11 by an interference signal. The difference amplifier 14 is followed by a demodulator 12. The demodulation signal applied to the demodulator 12 has a phase shift of the zero relative to the alternating magnetic field. The useful signal N1 which is proportional to the angular acceleration α is once more available at the output of the demodulator 12 and/or at the output of the low pass filters 13 connected after the demodulator 12.

The other excitation and measurement arm is configured in essentially the same way. The excitation elements 6, however, produce alternating magnetic fields with a fundamental frequency f2. This fundamental frequency f2 can be different from the fundamental frequency f1. In addition the excitation elements 6 which produce the alternating magnetic fields with the fundamental frequency f2, can be configured differently from the excitation elements 6 which produce the alternating magnetic fields with a fundamental frequency f1. This is indicated in FIG. 4 by a different orientation of the dotted lines for the excitation elements 6 that produce alternating magnetic fields with the fundamental frequency f1 from those excitation elements 6 which produce alternating magnetic fields with the fundamental frequency f2.

The sensor elements 11 used to generate the useful signal N2 can also be designed differently from set sensor elements 11 which generate the useful signal N1. Accordingly, the arrangement for determining the useful signal N2 that is proportional to the velocity can be optimized independently of the arrangement for determining the useful signal N1 that is proportional to the acceleration.

Embodiments intermediate between the embodiment depicted in FIG. 4 and the fundamental form according to FIGS. 1 to 3 are also feasible. For example, only two excitation elements 6 and two sensor elements 11 can be provided. In this case, either symmetric errors can be eliminated (by a difference formation) or the useful signals N1, N2 can be determined in mutually independent excitation and measurement arms.

In the embodiment depicted in FIGS. 5 and 6, two excitation elements 6 and two sensor elements 11 associated with the respective excitation elements 6 are provided. Currents I1, I2 are applied to the excitation elements 6, as seen in FIG. 6, which represent essentially a square wave with zero offset. For the first half of each period, the value of the current I1 and/or the current I2 is +I0, and for the second half of the period the value the current I1 and/or the current I2 is −I0. The alternating magnetic fields produced by the excitation elements 6 correspond approximately to the currents I1, I2.

As long as the current I1 is constant, the measurement signal U1 of the corresponding sensor element 11 is essentially proportional to the angular acceleration α. When the current I1 changes from the value +I0 to the value −I0 or vice versa, the measurement signal U1 has essentially only one component which is proportional to the velocity.

The component of the measurement signal U1 that is proportional to the velocity decays to zero with a decay time T. From this point in time until the next level change of the current I1, the measurement signal U1 is directly proportional to the angular acceleration α. During this time, the useful signal N1 is therefore identical to the measurement signal U1. By a suitable choice of the fundamental frequency f, the useful signal N1 can at least partially be directly determined, namely in particular shortly before the switchover and/or for example also halfway between two switching points.

Due to the fast switchover at the switching points, the measurement signal U1 at these points is essentially proportional to the velocity. The small acceleration-dependent component can typically be neglected since the transition is very fast. At these points in time, the angular velocity ω can therefore be determined directly from the measurement signal U1.

The same discussion in connection with the current I1 and the measurement signal U1 applies also to the current I2 and the measurement signal U2. However, the current I2 is a phase-shifted relative to the current I1 by a quarter period. Accordingly, the measurement signal U2 is also phase-shifted relative to the measurement signal U1 by a quarter period. By outputting the measurement signals U1, U2 as useful signals N1, N2 at those points in time, where one of the currents I1, I2 undergoes a level change, the angular velocity ω as well as the angular acceleration α can be outputted at a rate corresponding to four times the fundamental frequency of the currents I1, I2. The useful signal N1 which is proportional to the angular acceleration α may even be outputted continuously.

FIG. 7 depicts an embodiment of the motion detector with two excitation elements 6 and two sensor elements 11 associated with the excitation elements 6. The excitation elements 6 apply alternating magnetic fields to the induction element 2 at the same fundamental frequency f, however with a phase shift that is a quarter period of the fundamental frequency f. The measurement signals U1, U2 have then the following relationships:

$$U1=k1\ \alpha\ \cos-k2\ \omega\ \sin,\ \text{and} \tag{2}$$

$$U2=k1\ \alpha\ \sin+k2\ \omega\ \cos \tag{3}$$

Due to the phase shift between the alternating magnetic fields, the instantaneous angular velocity ω and the instantaneous angular acceleration α can be determined at each point in time by a suitable linear combination. In particular, at each point in time t (also, in particular, without time-averaging):

$$k1\ \alpha=U1\ \cos+U2\ \sin,\ \text{and} \tag{4}$$

$$k2\ \omega=-U1\ \sin+U2\ \cos. \tag{5}$$

FIG. 8 shows a modified embodiment of FIG. 7 with four sensor elements 11. In this modification, the excitation elements 6 are arranged crosswise. The sensor elements 11 each project over two directly adjacent extensions of the excitation elements 6. The following conditions then exist for the measurement signals U1 to U4:

$$U1=k1\ \alpha(\cos-\sin)-k2\ \omega(\cos+\sin), \tag{6}$$

$$U2=k1\ \alpha(\cos+\sin)+k2\ \omega(\cos-\sin), \tag{7}$$

$$U3=-U1,\ \text{and} \tag{8}$$

$$U4=-U2. \tag{9}$$

The angular acceleration α and the angular velocity ω are then given by the following equations:

$$k1\ \alpha=(\cos-\sin)(U1-U3)+(\cos+\sin)(U2-U4)\ \text{and} \tag{10}$$

$$k2\ \omega=-(\cos+\sin)(U1-U3)+(\cos-\sin)(U2-U4). \tag{11}$$

The procedure according to FIG. 8 is hence technically more complex than the procedure according to FIG. 7. However, by symmetric errors can be eliminated by forming differences, as discussed above with reference to the embodiment of FIG. 4.

Figure 9:
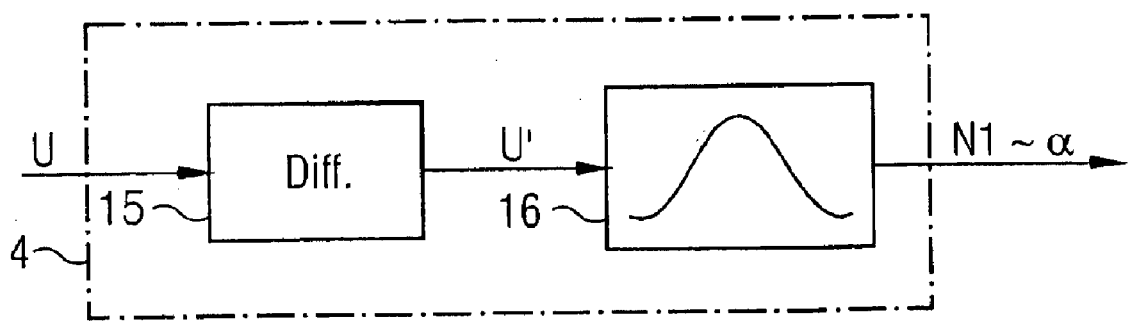
FIG. 9 shows another signal processing circuit.

FIG. 9 shows an embodiment of the invention, wherein by selecting suitable dimensions, the measurement signal U can made essentially proportional to the angular velocity ω, although a residual component depends on the acceleration α of the induction element 2. As also shown in FIG. 9, the measurement signal U is supplied to a differentiator 15 which differentiates the measurement signal U. The differentiated measurement signal U' is supplied to a following low-pass filter 16 which ensures that the differentiated measurement signal U' is below a cutoff frequency and essentially proportional to the angular acceleration α.

The differentiator 15 and the low-pass filter 16 can be implemented in a conventional manner, also in a common block.

The motion detectors according to the invention make it possible to determine in a simple matter at least one useful signal N1 which is proportional exclusively to the angular velocity ω and/or exclusively proportional to the angular acceleration α, although the excitation is performed with a time-dependent alternating magnetic field. The signal-to-noise ratio is significantly improved, in particular for the angular acceleration α, over a time-independent magnetic excitation, when modulating with the fundamental frequency f, f1.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and their equivalents:

1. A motion detector according to the Ferraris principle, comprising:
   an excitation assembly including at least one primary excitation element for producing an inhomogeneous time-dependent alternating magnetic field having a fundamental frequency with a period,
   a movable electrically conducting induction element, with the inhomogeneous time-dependent alternating magnetic field applied to the induction element, wherein a motion of the movable induction element and the alternating magnetic field induce an eddy current in the induction element, with temporal changes of the eddy current depending on a velocity or an acceleration of the movable induction element,
   a sensor assembly with at least one primary sensor element adapted to measure at least one measurement signal which is proportional to the temporal changes of the eddy current, and
   a signal processing circuit including at least one demodulator which receives the measurement signal and a sinusoidal demodulation signal at the fundamental frequency and provides at least one useful signal as an output signal of the demodulator, wherein the at least one useful signal is proportional to the velocity or the acceleration of the movable induction element.

2. The motion detector of claim 1, wherein the signal processing circuit includes a low pass filter connected after the at least one demodulator, and the at least one useful signal corresponds to the low-pass-filtered output signal of the demodulator.

3. The motion detector of claim 1, wherein the demodulation signal is phase-shifted relative to the alternating magnetic field by an integer multiple of a quarter period.

4. The motion detector of claim 1, wherein the alternating magnetic field is sinusoidal.

5. The motion detector of claim 1, wherein the alternating magnetic field is substantially a square wave.

6. The motion detector of claim 5, wherein during each period, the alternating magnetic field has for at least one time interval a constant nonzero value, and wherein the at least one time interval is greater than a rise or fall time of a change in the induced eddy current caused by a change of the alternating magnetic field.

7. The motion detector of claim 1, wherein the sensor assembly is implemented as a coil assembly.

8. The motion detector of claim 1, wherein the excitation assembly is implemented as a coil assembly.

9. A motion detector according to the Ferraris principle, comprising:
   an excitation assembly including at least one primary excitation element for producing an inhomogeneous time-dependent alternating magnetic field,
   a movable electrically conducting induction element, with the inhomogeneous time-dependent alternating magnetic field applied to the induction element,
   a sensor assembly with at least one primary sensor element adapted to measure at least one measurement signal, and a signal processing circuit, wherein a motion of the movable induction element and the alternating magnetic field induces an eddy current in the induction element, with temporal changes of the eddy current depending on a velocity or an acceleration of the movable induction element, wherein the at least one measurement signal which is proportional to the temporal changes of the eddy current is supplied to the signal processing circuit, wherein the signal processing circuit determines at least one useful signal, which is proportional to the velocity or the acceleration of the movable induction element, based on the at least measurement signal, wherein one of the at least one useful signals is proportional to the acceleration of the induction element and an additional useful signal which is provided by the signal processing circuit is correlated with the velocity of the induction element, and wherein the sensor assembly comprises at least one additional sensor element and the additional useful signal is derived from an additional measurement signal measured by the at least one additional sensor element.

10. The motion detector of claim 9, wherein the additional useful signal is derived from the measurement signal.

11. The motion detector of claim 9, wherein the at least one additional sensor element and the at least one primary sensor element are constructed differently.

12. The motion detector of claim 9, wherein the sensor assembly is implemented as a coil assembly.

13. The motion detector of claim 9, wherein the excitation assembly is implemented as a coil assembly.

14. The motion detector of claim 9, wherein the additional useful signal is determined from a linear combination of the least one measurement signal.

15. A motion detector according to the Ferraris principle, comprising:

an excitation assembly including at least one primary excitation element for producing an inhomogeneous time-dependent alternating magnetic field, and at least one additional excitation element capable of applying at least one additional inhomogeneous time-dependent alternating magnetic field to the induction element, wherein the alternating magnetic field of the additional excitation element has a fundamental frequency which is different from a fundamental frequency of the alternating magnetic field of the primary excitation element a movable electrically conducting induction element, with the inhomogeneous time-dependent alternating magnetic field applied to the induction element, wherein a motion of the movable induction element and the alternating magnetic field induces an eddy current in the induction element, with temporal changes of the eddy current depending on a velocity or an acceleration of the movable induction element, a sensor assembly with at least one primary sensor element adapted to measure at least one measurement signal which is proportional to the temporal changes of the eddy current is supplied to the signal processing circuit; and a signal processing circuit for determining at least one useful signal, which is proportional to the velocity or the acceleration of the movable induction element, based on the at least measurement signal.

16. The motion detector of claim 15, wherein the at least one additional excitation element and the at least one primary excitation element are constructed differently.

17. The motion detector of claim 15, wherein the sensor assembly is implemented as a coil assembly.

18. The motion detector of claim 15, wherein the excitation assembly is implemented as a coil assembly.

19. A motion detector according to the Ferraris principle, comprising:

an excitation assembly including at least one primary excitation element for producing an inhomogeneous time-dependent alternating magnetic field, and at least one additional excitation element capable of applying at least one additional inhomogeneous time-dependent alternating magnetic field to the induction element, wherein the alternating magnetic field of the primary excitation element has a same fundamental frequency as the alternating magnetic field of the additional excitation element, and wherein a phase of the alternating magnetic field of the primary excitation element is shifted relative to a phase of the additional excitation element, a movable electrically conducting induction element, with the inhomogeneous time-dependent alternating magnetic field applied to the induction element, wherein a motion of the movable induction element and the alternating magnetic field induces an eddy current in the induction element, with temporal changes of the eddy current depending on a velocity or an acceleration of the movable induction element, a sensor assembly with at least one primary sensor element adapted to measure at least one measurement signal which is proportional to the temporal changes of the eddy current and supplied to the signal processing circuit; and a signal processing circuit for determining at least one useful signal, which is proportional to the velocity or the acceleration of the movable induction element, based on the at least measurement signal, wherein the at least one useful signal is determined from a linear combination of the at least one measurement signal.

20. The motion detector of claim 19, wherein the at least one additional excitation element and the at least one primary excitation element are constructed differently.

21. The motion detector of claim 19, wherein the sensor assembly is implemented as a coil assembly.

22. The motion detector of claim 19, wherein the phase shift is an integer multiple of a quarter period of the fundamental frequency.

23. A motion detector according to the Ferraris principle, comprising:

an excitation assembly including at least one primary excitation element for producing an inhomogeneous time-dependent alternating magnetic field, a movable electrically conducting induction element, with the inhomogeneous time-dependent alternating magnetic field applied to the induction element, wherein a motion of the movable induction element and the alternating magnetic field induces an eddy current in the induction element, with temporal changes of the eddy current depending on a velocity or an acceleration of the movable induction element, a sensor assembly with at least one primary sensor element adapted to measure at least one measurement signal which is proportional to the temporal changes of the eddy current and supplied to the signal processing circuit; and a signal processing circuit for determining at least one useful signal which is proportional to the velocity or the acceleration of the movable induction element, based on the at least measurement signal, wherein the at least one measurement signal is substantially proportional to the velocity of the movable induction element, and differentiated by the signal processing circuit, said signal processing circuit including a low-pass filter for limiting the bandwidth of the differentiated measurement signal.

24. The motion detector of claim 23, wherein the sensor assembly is implemented as a coil assembly.

25. The motion detector of claim 23, wherein the excitation assembly is implemented as a coil assembly.

* * * * *